March 1, 1938.   A. R. HARMAN   2,109,449
MATERIAL REDUCING MEANS
Filed March 18, 1935   2 Sheets-Sheet 1
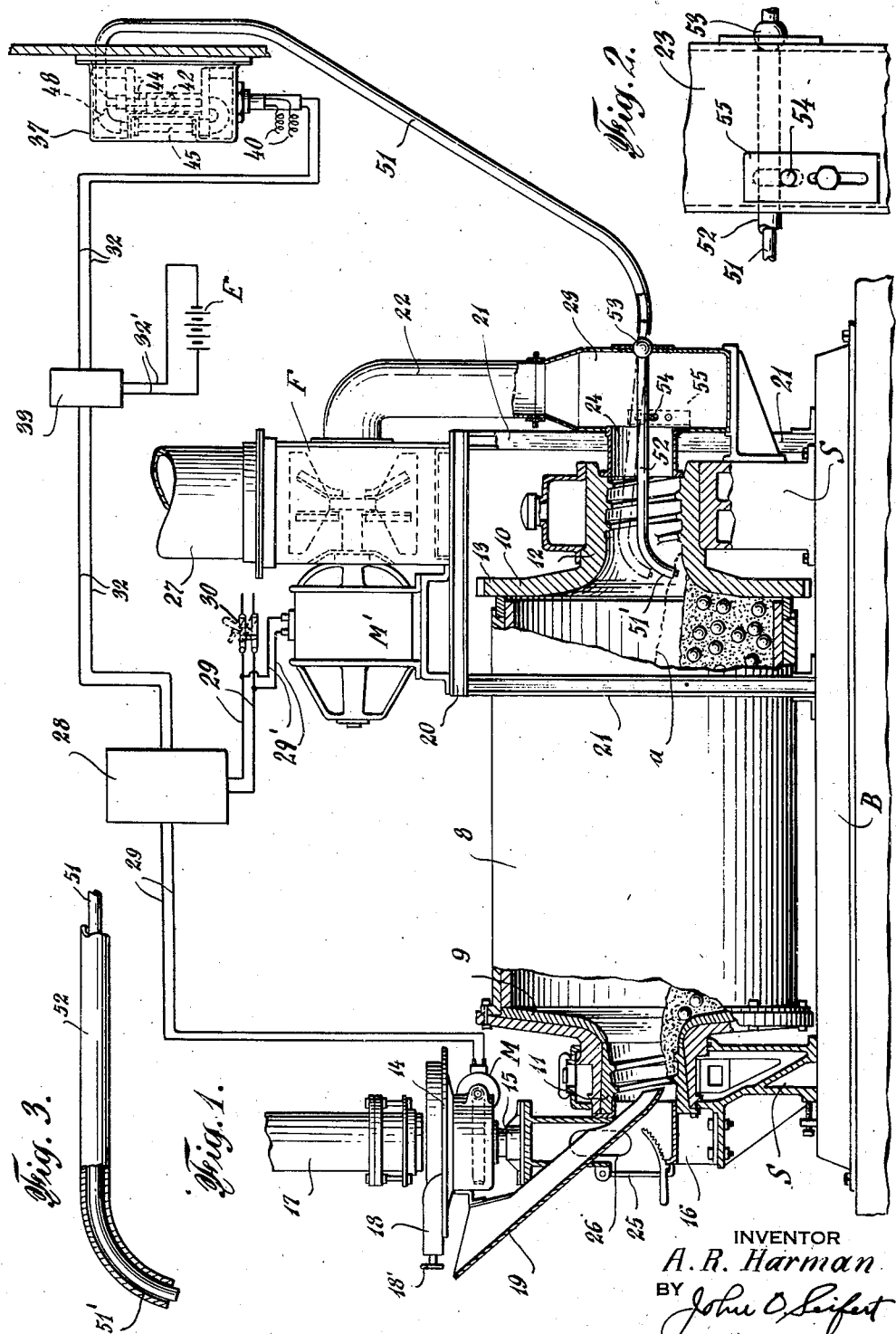
INVENTOR
*A. R. Harman*
BY *John O. Seifert*
ATTORNEY March 1, 1938.  A. R. HARMAN  2,109,449
MATERIAL REDUCING MEANS
Filed March 18, 1935  2 Sheets-Sheet 2

INVENTOR.
A. R. Harman
BY John O. Seifert
ATTORNEY

Patented Mar. 1, 1938

2,109,449

UNITED STATES PATENT OFFICE 2,109,449

MATERIAL REDUCING MEANS

Arlington R. Harman, Bloomsburg, Pa., assignor, by mesne assignments, to Reconstruction Finance Corporation, Philadelphia, Pa., a corporation of the United States Application March 18, 1935, Serial No. 11,729

1 Claim. (Cl. 83—9)

This invention relates to means for reducing material, such as coal, rock or ore, by either the dry or wet method, and relates particularly to reducing means of the tube mill type utilizing a revoluble drum containing the material reducing media therein, such as metallic balls, pebbles or rods, and to which drum the material to be reduced is fed and the reduced material delivered therefrom during the revolving of the drum.

In order that the mill will operate efficiently it is essential that the material to be reduced in the mill shall be in quantity sufficient to be above the reducing media, or in quantity sufficient to blanket the reducing media, since should the material to be reduced in the mill not be sufficient to blanket the reducing media not only is the capacity of the mill diminished, but an inferior product is produced as it will result in an imperfect reducing or pulverizing of the material. Should the material to be reduced in the mill not be sufficient to blanket the reducing media, there will also be a metal to metal contact between the reducing media and between such media and the lining with which such mills are provided and a consequent quick wearing of said parts and requiring frequent renewal of the same greatly increasing the maintenance cost of the mill. Should the material to be reduced be greater than a predetermined ratio of said material relative to the reducing media the reducing chamber will be overloaded and there will be a delivery of an imperfectly reduced material, particularly in the wet method of reducing material.

It is the object of the invention to provide means to regulate the quantity of material to be reduced or pulverized in the reducing chamber of a material reducing or pulverizing mill and maintain such material substantially at a predetermined level in the reducing chamber and in proper ratio to the reducing media to effect an efficient operation of the mill.

In apparatus for reducing or pulverizing material means is provided to feed the material to be reduced to the reducing chamber of the mill, and it is another object of the invention to provide means controlled by the pressure and level of the material in the mill to regulate the feeding of material to be reduced to the mill to prevent underloading or overloading of the reducing chamber of the mill and thus requiring the operator of the mill to give a minimum amount of time and attention to determine the conditions within the mill.

It is a further object of the invention to provide means controlled from the pressure within the mill to regulate the quantity of material in the reducing chamber of the mill and maintain the material substantially at a predetermined level therein.

Another object of the invention is to provide in material reducing apparatus to which the material is fed by means actuated by an electric motor having circuit making and breaking means connected in the circuit thereof with means to actuate the circuit making and breaking means to open and close the circuit controlled by the pressure and quantity of material in the reducing chamber of the material reducing means to render said motor for actuating the material feeding means active and inactive to feed material to the reducing means.

It is a further object of the invention to provide in material reducing apparatus electric motor operated means to feed material thereto having circuit making and breaking means connected in the electric circuit of the motor adapted to normally assume circuit opening position, and actuating means for said circuit making and breaking means rendered active by light sensitive means to close the circuit and render the motor and material feeding means active controlled by the pressure and quantity of the material in the reducing chamber of the material reducing apparatus.

In mills of this character no means is provided whereby the operator of the mill may determine the conditions within the mill; that is, the quantity of material to be reduced relative to the reducing media, other than by the noise of the reducing media striking against each other and the lining of the mill, and it is an object of the invention to provide means to indicate the conditions within the mill.

Other objects and advantages will hereinafter appear.

While the invention is applicable to various types of apparatus for reducing material by either the dry or wet method, in carrying out the embodiment of the invention illustrated there is provided a revoluble drum having openings for the feeding of material to be reduced into the drum and the delivery of the reduced material therefrom and also for the admission and passage of an air stream through the drum for the delivery of the reduced or pulverized material from the drum suspended in said air stream, and means operated by an electric motor for feeding material to the drum. To maintain a predetermined quantity of material in the drum means are provided to render the motor active and inactive to actuate the means to feed material to the drum and thereby regulate the feeding of the material to the drum controlled by the pressure and quantity of level of material in the drum, and shown as comprising a U-tube containing a suitable opaque liquid rising to a predetermined level in each leg and adapted to control the transmission of light from a source of light to and activate a light sensitive cell controlling the operation of an electric circuit making and breaking means in the motor circuit to render the motor and material feeding means active and inactive. One leg of the U-member is extended into and opens to the mill at a point below which the level of the material is to be maintained, the pressure induced in the drum by the drawing of the material delivering air stream through the drum causing a lowering of the level of the material in a leg of the U-member to permit the transmitting of the light rays from the source of light and projecting of the same onto the light sensitive cell, and said means, in the present instance, effecting actuation of means to operate the circuit making and breaking means to close the motor circuit and the operation of the feeding means to feed material into the drum. Should the material fed into the drum exceed the predetermined quantity necessary for the efficient operation of the mill and reduction of the material and the level of the material in the drum rise above and close the opening of the leg of the U-member extended into the drum, the reduced or pulverized material will enter into and effect a back pressure in the U-member and cause the liquid in the one leg to rise to a level to obscure the light rays from the source of light therethrough to the light sensitive cell and render the cell inactive to effect operation of the circuit making and breaking means, and said latter means assuming circuit opening position rendering the motor for the feeding means and said feeding means inactive to feed material to the drum.

In the drawings accompanying and forming a part of this application Figure 1 is a side elevation, partly in section, of a material reducing mill and means for feeding material to and delivering material from the mill, and showing in connection therewith an embodiment of means controlled by the pressure and level of the material in the mill for controlling the feeding and maintaining a predetermined quantity of material to be reduced in the mill.

Figure 2 is a detail view of means for adjustably mounting the extension of the one leg of the U-tube into the mill.

Figure 3 is a detail view, on an enlarged scale, and partly in section, of the portion of the leg of the U-tube extended into the mill and a shield therefor.

Figure 5:
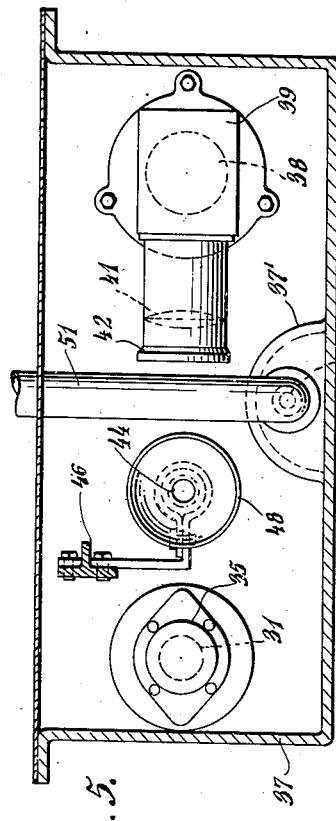
Figure 5 is a view looking at the top of Figure 4 with the enclosing casing in section.

The embodiment of the invention illustrated is shown in connection with a tube mill comprising a drum 8 having heads 9, 10 secured to and closing the opposite ends, each of said heads having a tubular trunnion 11, 12 whereby the drum is rotatably supported in pillar blocks or standards S, S' supported on a suitable base or foundation B. The drum is operatively connected to and rotated from a source of power (not shown) by suitable gearing, and shown as comprising an annular gear 13 encircling or integral with a head of the drum, as 10, adapted to mesh with a pinion on the shaft of an actuating motor. Each of the trunnions is provided with an internal rib of spiral or screw form, the rib in trunnion 11 being arranged to deliver material fed into said trunnion into the drum, and the rib in the trunnion 12 arranged to reenter material into the drum which may be delivered therein from the drum.

Suitable means are provided to feed material into the drum, and in the embodiment shown comprises what is known as a disk feeder embodying a disk 14 rotatably supported to rotate on a vertical axis or in a horizontal plane on a bracket 15 mounted on a casing 16 supported upon a lateral extension of the standard S and rotated by a motor M also carried by the bracket 15 having a gear drive connection with the disk. The material is delivered onto the disk from a source of supply, as through a chute 17, and delivered from the disk during the rotation thereof by a scraper 18 into a chute 19 extended through an opening in the casing 16 to deliver material into the trunnion 11.

The reduced or pulverized material is delivered from the drum in suspension in an air stream. Suction means is provided to cause air to flow into and from the drum carrying reduced or pulverized material in suspension therein, and shown as comprising a rotatable fan in a casing, as shown at F, rotated by a motor M', the fan and motor being mounted upon a platform 20 supported in a plane above the mill by suitable supports, as 21. The intake of the fan is connected with the drum trunnion 12 by a conduit 22 connected with a box or casing 23 connected with the drum trunnion by a sleeve 24 that may be fixed in an opening in the casing 23 and rotatable in the drum trunnion, or vice versa. By the rotation of the fan a stream of air or gas is drawn into, through and from the mill, the volume of air drawn into and volume of velocity of air drawn through the drum being regulated by an adjustable closure 25 for an opening in the casing 16 to supply air at the temperature of the prevailing atmosphere, or such air may be heated by connecting a conduit leading from a source of heated air supply to an opening 26 in said casing. For this purpose means are also provided in the connecting means of the intake of the fan with the drum for supplying air in regulatable volume to the fan for mixing air with the air stream drawn from the drum. The air stream is delivered from the drum through a conduit 27 connected to the outlet thereof and leading to a place of storage or use, such as burners mounted in a furnace, the mill being in effect means for preparing and the firing of a furnace or furnaces with pulverized fuel. The material is reduced or pulverized by reducing or grinding media in the drum operative by the revolving of the drum to cascade with the material in the drum and thereby impact against the material to be reduced, and while the reducing media is shown as comprising steel balls it may consist of rods or bars. While the invention is illustrated and described in connection with material reducing apparatus wherein the product or pulverized material is delivered from the reducing chamber of the mill in suspension in an air stream, the invention is also applicable to apparatus for wet grinding or reducing of material and embodying a revoluble drum having reducing media therein together with a suitable liquid and the material delivered from the drum by a suitable mechanical means, in which case the drum trunnion 12 is not provided with the means for reentering the material into the drum which may have been delivered into said trunnion.

To maintain the material to be reduced in the drum in sufficient quantity and proper ratio to the reducing media, means are provided to regulate the feeding of material to the drum controlled by the pressure and quantity or level of the material in the drum. For this purpose a suitable switch mechanism, such as a relay or electromagnetically actuated circuit making and breaking means, shown in a conventional manner at 28 and that may be of any commercial approved type, is interposed in the conductors 29 or circuit of the actuating motor M for the feeding means with a source of electricity (not shown), the conductors leading from the source of electric energy to the circuit making and breaking means 28 being provided with a manually operative switch, shown in a conventional manner at 30. The circuit maker of the circuit making and breaking means is normally urged to circuit opening position and actuated to and retained in circuit closing position upon the energization of its operating electromagnet.

To regulate the feeding of material to the drum and thereby the material below a predetermined level in the drum, means are provided to energize and de-energize the operating electromagnet for and actuate the circuit making and breaking means 28 to close and open the circuit and render the motor M and thereby the feeding means 14 active and inactive. As shown in Figures 1 to 6 this means comprises a selenium light sensitive cell 31 of the usual structure connected in circuit with the operating electromagnet for the circuit making and breaking means 28 through electric conductors 32, the electric impulses of the light sensitive cell being amplified or increased by an amplifier of suitable structure and power, shown in a conventional manner at 33, to assure positive energization of the operating electromagnet for the circuit making and breaking means, the amplifier being connected by conductors 32' with a source of electric energy, as indicated at E, or it may be connected in a local circuit with the lead-in conductors 29. The light sensitive cell is enclosed in a housing 34 having an opening 35 therein and is mounted by its base 36 in a casing 37 having an opening in the side with a flange laterally extending therefrom whereby it is adapted to be mounted on a supporting panel or wall. The light sensitive cell is rendered active to close the electric circuit of the operating electromagnet of the circuit making and breaking means by a light beam or rays from a source of light transmitted thereto through an opening 35 in the housing 34, as from an incandescent electric lamp 38 arranged in a housing 39 mounted in the casing 37 and connected by conductors 40 with a source of electric energy, which may be by way of the lead-in conductors 29, the beam or light rays from the lamp 38 being directed to the light sensitive cell through the opening 35 in the housing by a condenser lens embodying a pair of lenses 41 mounted in a tubular carrier 42 extended from the lamp housing 39.

Figure 4:
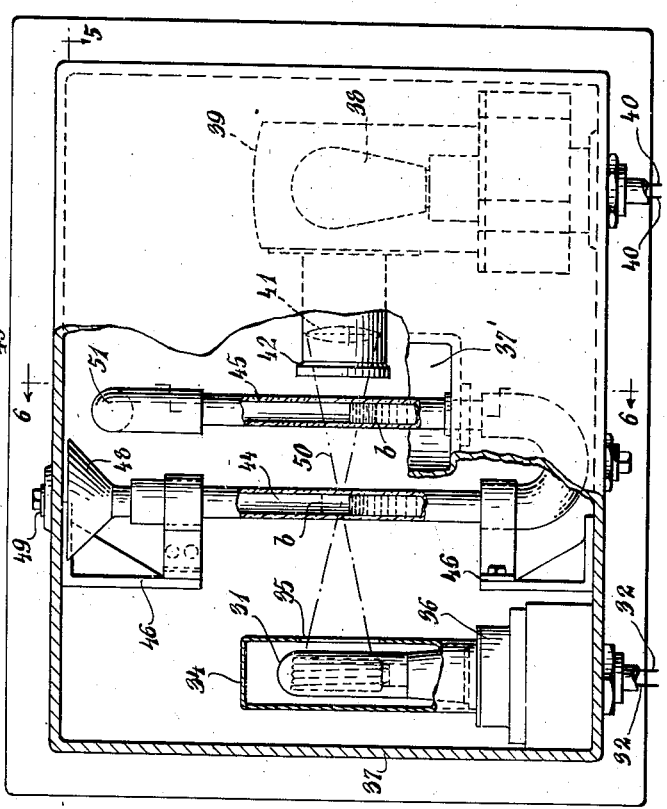
Figure 4 is a front elevation of light sensitive means for controlling the actuation of the motor circuit making and breaking means and the means for controlling the light sensitive means from the pressure and quantity of the material in the mill, and showing an enclosing casing therefor in section.
Figure 6:
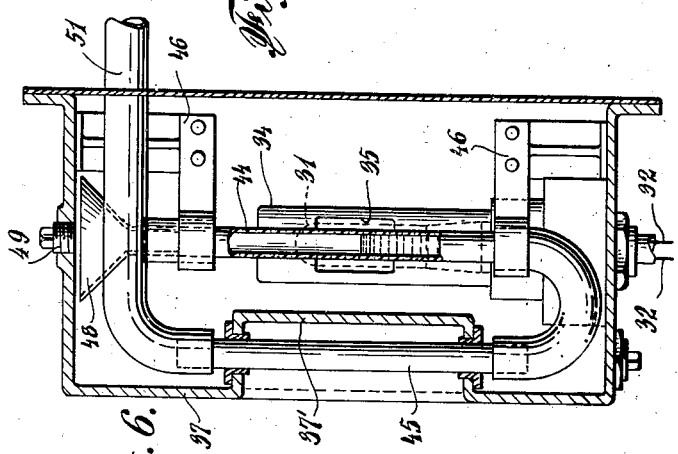
Figure 6 is a cross sectional view taken substantially on the line 6—6 of Figure 5 looking in the direction of the arrows.

The transmitting of the light beam or rays from the lamp 38 to the light sensitive cell is controlled by pressure responsive means comprising the rise and fall of an opaque or light obscuring liquid in a leg 44 of transparent material of a U-tube interposed between the condenser lens 41 and the light sensitive cell in the casing 37, the U-tube being mounted in the casing with the other leg 45 of transparent material arranged in a recessed portion 37' exterior of the casing 37 for visual observation, the U-tube being mounted in the casing by brackets 46. The leg 44 of the U-tube is open to the atmosphere and has a funnel member 48 connected to the open end in line with an opening in the top of the casing 37 for the filling of the liquid into the U-tube, the casing opening being closed by a removable plug, as shown at 49. The leg 44 of the U-tube is arranged so that the focus of the light rays 50 from the condenser lens will intersect in said leg of the tube, as shown in Figure 4, and the quantity of the liquid in the U-tube is such that normally the level thereof in both legs will be slightly below the point of focus of the light rays in the tube leg 44 and in position to transmit light rays to the light sensitive cell through the opening in its housing energizing the operating electromagnet for the circuit making and breaking means 28 to close the circuit to render the motor M and feeding means 14 active and feed material to the reducing chamber of the mill, and the circuit of the operating electromagnet for the circuit making and breaking means 28 being broken and the electromagnet de-energized by the rise of the level of the liquid in the leg 44 of the U-tube to obstruct the transmitting of light rays from the lamp 38 to the light sensitive cell.

The rise and fall of the liquid in the leg 44 of the U-tube is effected and controlled by the pressure and quantity or level of the material in the material reducing chamber 8. For this purpose the leg 45 of the U-tube is connected or extended into the drum 8 and opens to the drum at a predetermined point above the bottom and below which the level of the material is to be maintained in the drum, and shown as comprising a conduit 51 connected to the top of the leg 45 of the U-tube extended through the box or casing 23 and the drum trunnion 12 to a point adjacent the connection of said trunnion with the chamber in the drum, the end of the conduit being bent laterally and extended downward to open to the drum at a level below which the material is to be maintained therein, as shown at 51' in Figure 1. The portion of the conduit within the box 23 and drum trunnion is carried within a tubular member 52 (Figure 3) to serve as a sheathing and shield therefor.

In operation when the circuit is closed by the switch 30 and the liquid in the legs of the U-tube is at the same level and not obstructing the light rays from the lamp 38 through the tube leg 44 the fan motor M' will be started and the circuit of the motor M closed through the circuit making and breaking means 28 to actuate the feeder 14 to feed material to the reducing chamber in the mill. By the drawing of the air stream through and from the drum by the fan F there will be a slight minus pressure in the drum and in the leg 45 of the U-tube through its connection with the reducing chamber through the extension 51 thereof, slightly raising the level of the liquid in said leg of the U-tube and correspondingly lowering the level of the liquid in the leg 44 of the U-tube assuring the light rays from the condenser lens 41 being transmitted to the light sensitive cell. Such condition will be maintained while the quantity or level of the material in the drum is maintained below the opening in the bent end 51' of the conduit 51, as shown in full lines in Figure 1. Should the material fed to the reducing chamber be greater in quantity than the material delivered from the mill and a consequent raising of the level of the material so as to obstruct the opening of the conduit 51 to the mill, as shown in dotted line a in Figure 1, there will be a slight back pressure in the conduit 51 and leg 45 of the U-tube due to the head of the liquid in the U-tube with the result that reduced or pulverized material will enter the opening of the conduit 51 to the reducing chamber and cause sufficient back pressure in the leg 45 of the U-tube to raise the level of the liquid in the leg 44, as shown at b, to obscure or shut off the transmission of the light rays from the condenser 41 through the leg 44 of the U-tube to the light sensitive cell and closing the circuit of and de-energizing the operating electromagnet for the circuit making and breaking means, and said means automatically operating to open the circuit of and render the motor M and the material feeding means inactive to feed material to the drum. This condition will prevail until the quantity or level of the material in the drum is lowered below the opening of the conduit 51 to the reducing chamber when the level of the liquid in the leg 44 of the U-tube will be lowered to a position not to obstruct the light rays from the lamp to the light sensitive cell and effect operation of the cell to close the circuit and energize the operating electromagnet for and actuation of the circuit making and breaking means 28 to close the circuit of and render the motor M and feeding means active to feed material to the drum.

By arranging the leg 45 of the U-tube in the recessed portion 37' of the casing 37 where it may be readily observed, and the providing of the same with a graduated or indicating line, the operator may readily ascertain and determine the conditions of the material in the mill; that is, determine whether or not the quantity of the material in the reducing chamber is sufficient for the efficient reducing of the material, and whether or not the mill is overloaded or in underloaded condition and take corrective steps to change any condition that may be present in the mill leading to an inefficient reducing of the material, such, for instance, as adjusting the feeding means by manually adjusting the scraper 18 by its adjusting means 18' to effect an increase or reduction in the material fed to the mill.

Should it be found desirable or necessary to the efficient reduction of the material to have a greater or less quantity of material in the mill, means are provided to adjust the portion of the conduit 51 extended into the mill to raise or lower the open end relative to the bottom of the mill. To effect this adjustment the open end of the conduit is raised or lowered which is effected by providing a fulcrum support for the conduit or the shield 52 therefor in the wall of the box 23, as shown at 53, and support the conduit forward of said support as by a bar 54 extending transversely of the box 23, the ends of the bar being extended through elongated openings in the opposite sides of the box and supported by plates adjustably mounted on the box, as by bolts, as shown at 55. This adjustment is particularly applicable in connection with the wet method of reducing material when the material is delivered from the mill suspended in a liquid.

While the invention is illustrated and described for use in connection with a mill embodying a drum wherein the material is fed and air entered into one end of the drum and the material is delivered from the opposite end of the drum, the invention is also applicable to a mill embodying a drum of this character wherein the material is fed into one end thereof and the air is entered into and the material discharged from the opposite end of the drum, or a mill embodying a drum wherein the material is fed to and the material delivered from one end and the air is entered into the opposite end of the drum.

Furthermore, while there is illustrated and described one means controlled by the pressure and quantity or level of the material in the material reducing chamber of the mill for effecting the closing and opening of the circuit of the actuating motor M for the feeding means, it is to be understood that the invention is not limited to such specific means, and it will also be obvious that various modifications may be made in construction and arrangement of the parts without departing from the scope of the invention.

Having thus described my invention, I claim:

In material reducing means including a material reducing chamber and electric motor operated means to feed material into the reducing chamber, suction means to cause air to flow into and from the reducing chamber carrying reduced material in suspension therein, electromagnetically operated circuit making and breaking means interposed in the motor circuit, a light sensitive cell connected in circuit with said circuit making and breaking means, a source of light to activate said cell, a U-tube of transparent material arranged with one leg interposed between the source of light and light sensitive cell to intersect the light rays from the source of light, said U-tube carrying a liquid therein having the property of obstructing the transmission of light rays therethrough and the level of the liquid in the leg of said tube intersecting the light rays adapted to permit transmission of light from the source of light to and shut off the light from the light sensitive cell to control the actuation of the circuit making and breaking means to render the motor and feeding means active and inactive to feed material into the reducing chamber, a tube connected to the other leg of the U-tube and extended into and opening to the reducing chamber at a level below which the material is to be maintained in the reducing chamber and adapted when the level of the material in the reducing chamber falls below the opening to the tube to create a minus pressure therein through the action of the suction means and cause the liquid in the leg of the U-tube intersecting the light rays to assume a level below the point of and permit transmission of light rays through said leg of the tube to the light sensitive cell and maintain it at said level by the pressure in the reducing chamber with the level of the material therein below the opening of the tube extended into the reducing chamber and rendering the motor and feeding means active to feed material into the reducing chamber, and the level of the liquid in said leg of the U-tube caused to be raised to shut off the light from the source of light to the light sensitive cell and render the motor and feeding means inactive to feed material into the reducing chamber by a raising of the material in the reducing chamber to a level to obstruct the opening to the tube extended therein, a housing in which the source of light and light sensitive cell are enclosed and carrying the U-tube with the leg intersecting the light rays within the housing and the other leg exterior of the housing and constituting a visible indicator.

ARLINGTON R. HARMAN.